June 30, 1964 P. D. LYONS 3,139,490

SOUND REPRODUCING AND RECORDING DEVICE

Filed Oct. 15, 1958

9 Sheets-Sheet 1

INVENTOR.

Philip D. Lyons

June 30, 1964 P. D. LYONS 3,139,490

SOUND REPRODUCING AND RECORDING DEVICE

Filed Oct. 15, 1958 9 Sheets-Sheet 2

INVENTOR.

BY Philip D. Lyons

June 30, 1964 P. D. LYONS 3,139,490

SOUND REPRODUCING AND RECORDING DEVICE

Filed Oct. 15, 1958 9 Sheets-Sheet 3

INVENTOR.

BY Philip D. Lyons

INVENTOR.
BY Philip D. Lyons

June 30, 1964 P. D. LYONS 3,139,490

SOUND REPRODUCING AND RECORDING DEVICE

Filed Oct. 15, 1958 9 Sheets-Sheet 5

INVENTOR.

BY Philip D. Lyons

June 30, 1964 P. D. LYONS 3,139,490

SOUND REPRODUCING AND RECORDING DEVICE

Filed Oct. 15, 1958 9 Sheets-Sheet 6

INVENTOR.

BY Philip D. Lyons

INVENTOR.
BY Philip D. Lyons

June 30, 1964 P. D. LYONS 3,139,490

SOUND REPRODUCING AND RECORDING DEVICE

Filed Oct. 15, 1958 9 Sheets-Sheet 8

INVENTOR.
BY Philip D. Lyons

June 30, 1964 P. D. LYONS 3,139,490

SOUND REPRODUCING AND RECORDING DEVICE

Filed Oct. 15, 1958

9 Sheets-Sheet 9

INVENTOR.

BY Philip D. Lyons

United States Patent Office 3,139,490

Patented June 30, 1964

3,139,490

SOUND REPRODUCING AND RECORDING DEVICE

Philip Daniel Lyons, 1515 Brummel St., Evanston, Ill.

Filed Oct. 15, 1958, Ser. No. 767,322
12 Claims. (Cl. 179—115.5)

Figure 1:
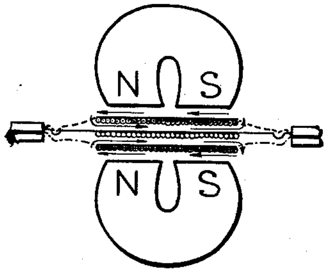
Figure 2:
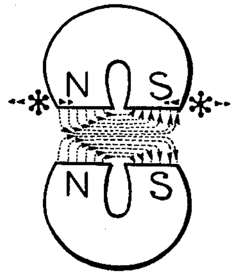

The arrangement of the essential parts and forces on which may invention depends for its successful operation is shown in FIGURES 1 and 2 of the enclosed nine sheets of drawings. A magnetic air gap having flattened and orientated magnetic lines of force is formed between the poles of two identical horseshoe magnets. The poles of the magnets are arranged so that the magnets repel each other—i.e. so that the north pole of one of the magnets faces the north pole of the other magnet, and the south pole of one of the magnets, the south pole of the other. A diaphragm, whose edges are supported outside this air gap, is suspended within the gap so that the surface of the diaphragm is substantially parallel to the flattened and orientated magnetic lines of force and to the pole faces of these two magnets. A signal-conveying coil of wire is wound over and cemented to a surface of the diaphragm so that a current passing in either direction through this coil cuts all the flattened and orientated magnetic lines of force lying on the surface of the coil, at substantially an angle of 90° and always in the same direction relative to the orientated directions or paths of the magnetic lines of force. At the point where the current in the wire cuts one of these lines of magnetic force lying on its surface at a substantially 90° angle, the wire will experience an electromagnetic force acting on it perpendicular to the plane determined by the intersection of the path of the current with that line of magnetic force. This force can be in either of two directions depending on the direction of the current in the coil with respect to the direction or paths of the lines of magnetic force it cuts. It is, of course, necessary that this relationship (of the direction of the current in the coil relative to the direction or paths of the magnetic lines of force it cuts) for every point on the coil be held constant for a given direction of current flow so that every point on the diaphragm secured to the coil receives the same direction of induced electromagnetic force. Under the influence of this force, the diaphragm will move away from the poles of one of the horseshoe magnets and towards the poles of the other, its surface, all the while, remaining substantially parallel to the pole faces of the two magnets. The air in the space between either side of the diaphragm and the north and south poles of the horseshoe magnet it faces is either compressed or rarefied depending on the direction of the current through the coil on the diaphragm. If a fluctuating signal current, representing the electrical equivalent of a sound wave, is passed through this coil, the coil, and consequently the diaphragm, will vibrate in sychronism with the current, compressing and rarefying the air within the spaces just mentioned. Either compressed and rarefied volume of air generates sound waves that can be, in practice very nearly perfect reproductions of the original sound waves. These mechanical reproductions of the original sound waves can be channeled through the throat of a horn, in which case my invention would be utilized as the motor mechanism of a horn loudspeaker. The mechanism could just as easily be adapted as the motor mechanism of a headphone or receiver by substituting an earpiece for the horn throat. If the operation of my device is inverted, i.e. operated as a generator, it can be utilized in the form of a microphone or phonograph pickup to convert sound waves into their electrical equivalents. Perhaps a good descriptive title for this motor-generator design is—Opposed Magnets Design—and I will mean my invention whenever I use this title.

The opposed magnets design combines the desirable features of the diaphragm and actuating, or signal conveying coil being one and the same thing with moving coil design efficiency. Unlike the ribbon design, the width of the diaphragm and coil in the opposed magnets design is not determined or limited entirely, by the maximum allowable gap clearance between a north pole piece and a south pole piece of a magnet. Furthermore, diaphragms of much larger surface area can be utilized within a single motor unit using my design than within units employing the moving coil design since my method of evenly distributing the driving force over the surface of the diaphragm greatly reduces the need for rigidity in the diaphragm; consequently, compression-type horn loudspeaker drivers using the principles of opposed magnets construction can be designed to efficiently reproduce the bass spectrum of sounds. Another notable feature of my design is its simplicity. The quality of sound reproduced by my design (as ascertained by a model I built in the form of a headset) appears to me to be at least as good as that I obtained through a high grade headset using the moving coil design for its operation. Excellent transient response and excellent separation of complex sounds occurring simultaneously was noticed at relatively high volume levels. In short, the quality of the sound is very natural and realistic. The demagnetization of the permanent magnets in my design by currents flowing through the signal-conveying coil appears to follow a law of electrical theory which states that if a permanent magnet of the alnico type is subjected to a field which tends to demagnetize it, the magnet will undergo a certain amount of demagnetization depending on the strength of the field at its greatest intensity, and that any subsequent field intensities reached, as long as they are below the greatest field intensity previously reached, will cause no further demagnetization of the magnet. The alnico 5 magnets in my model headphone have been placed in an opposing position for about three quarters of a year and the headphone was operated regularly at high volume levels with inputs of fifteen watts or more, and during this time the performance of the headphone did not appear to have been affected by demagnetization of the magnets. Electromagnets (which could be soft iron horseshoe magnets with a field coil or coils, wound between their poles) would not be subject to demagnetization and their use, especially in units requiring very large magnets, could result in important economies in their cost of production.

Figure 3:
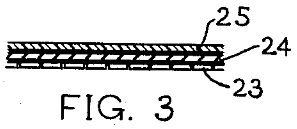
Figure 4:
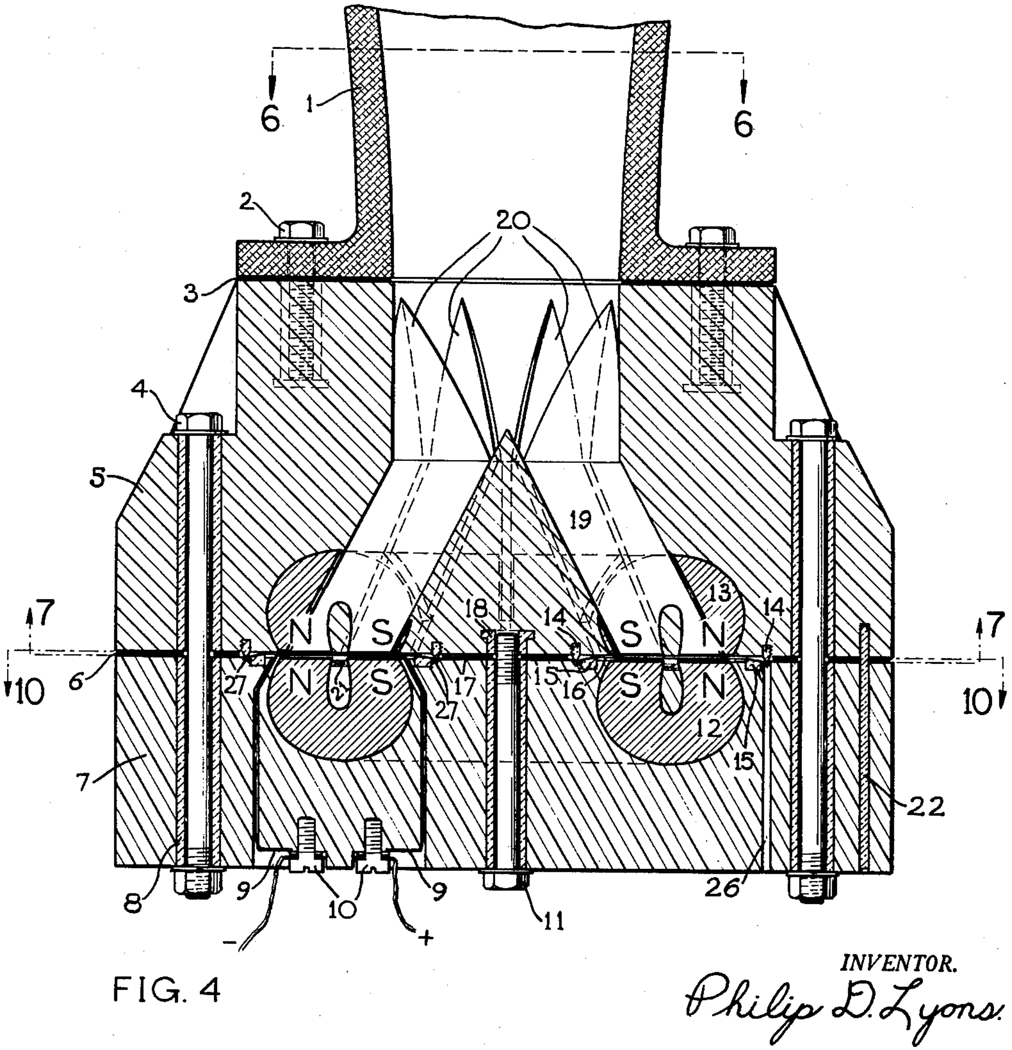
Figure 5:
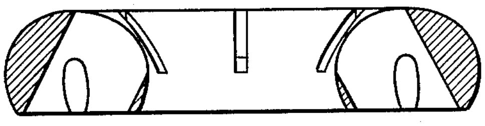
Figure 6:
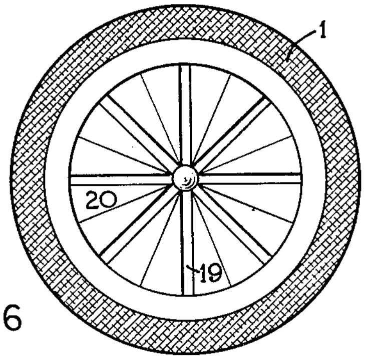
Figure 7:
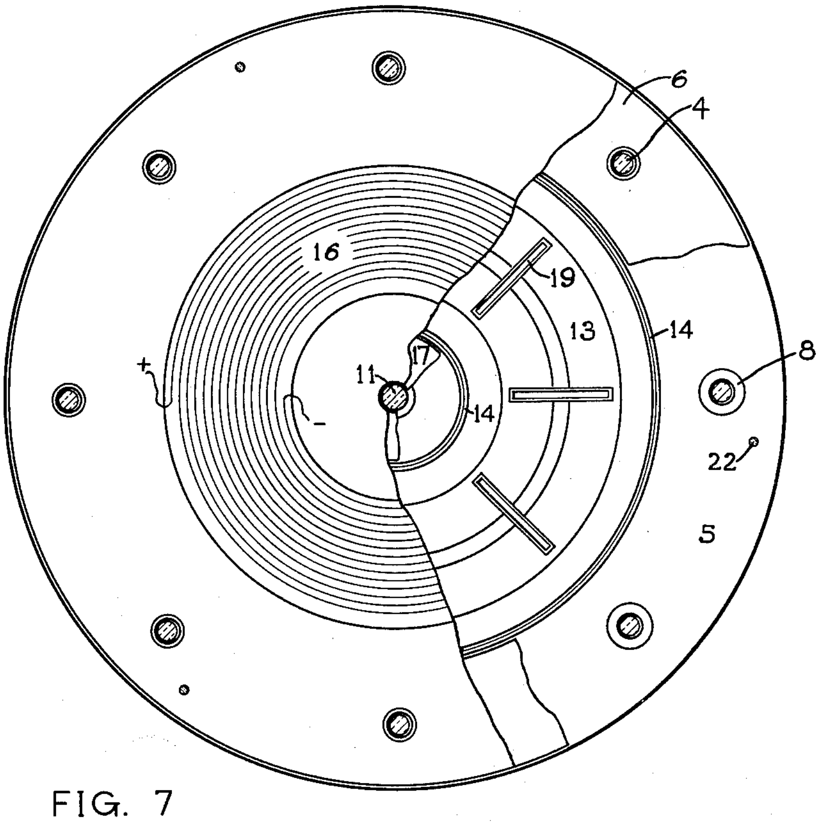
Figures 8, 9, 10:
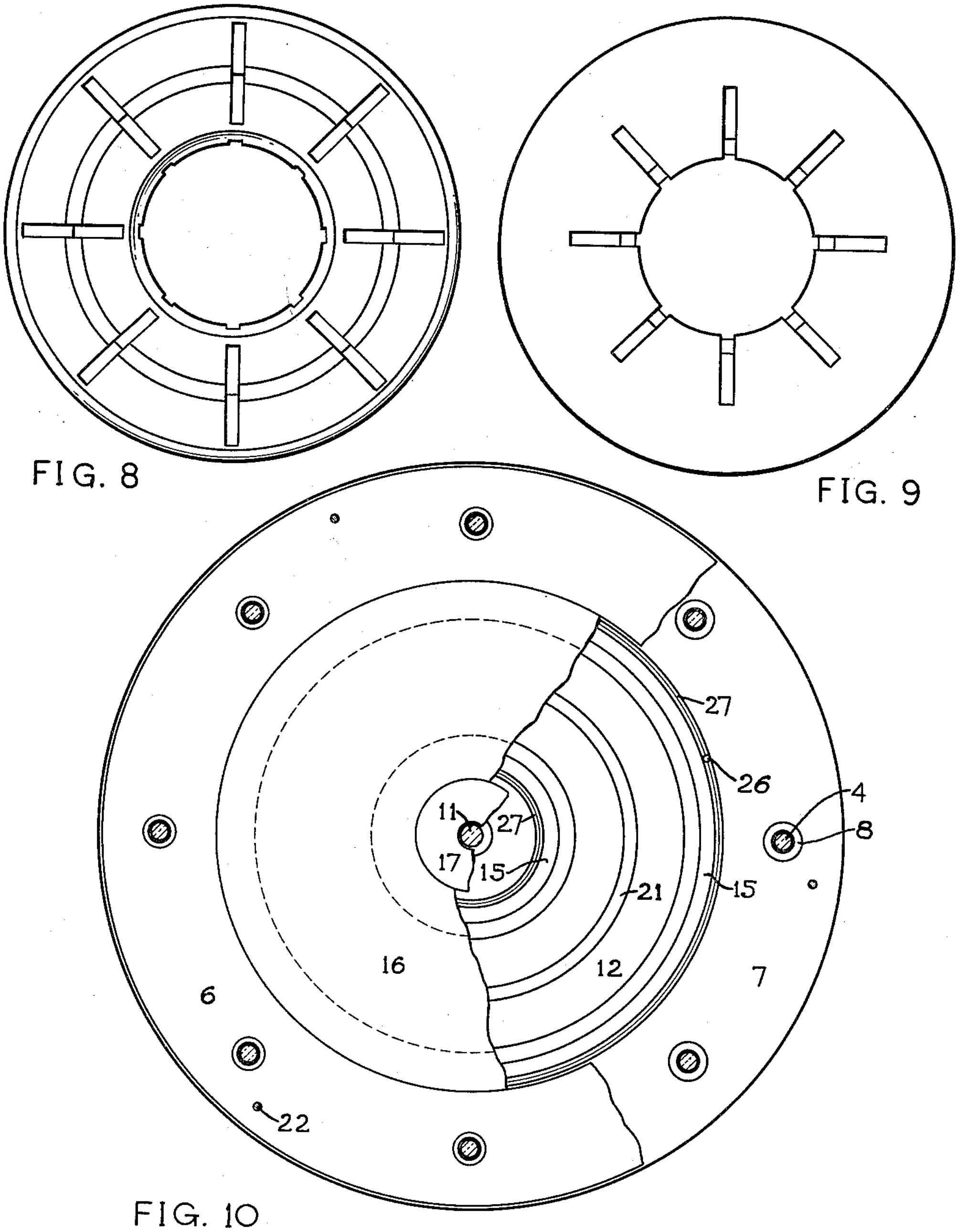
Figure 11:
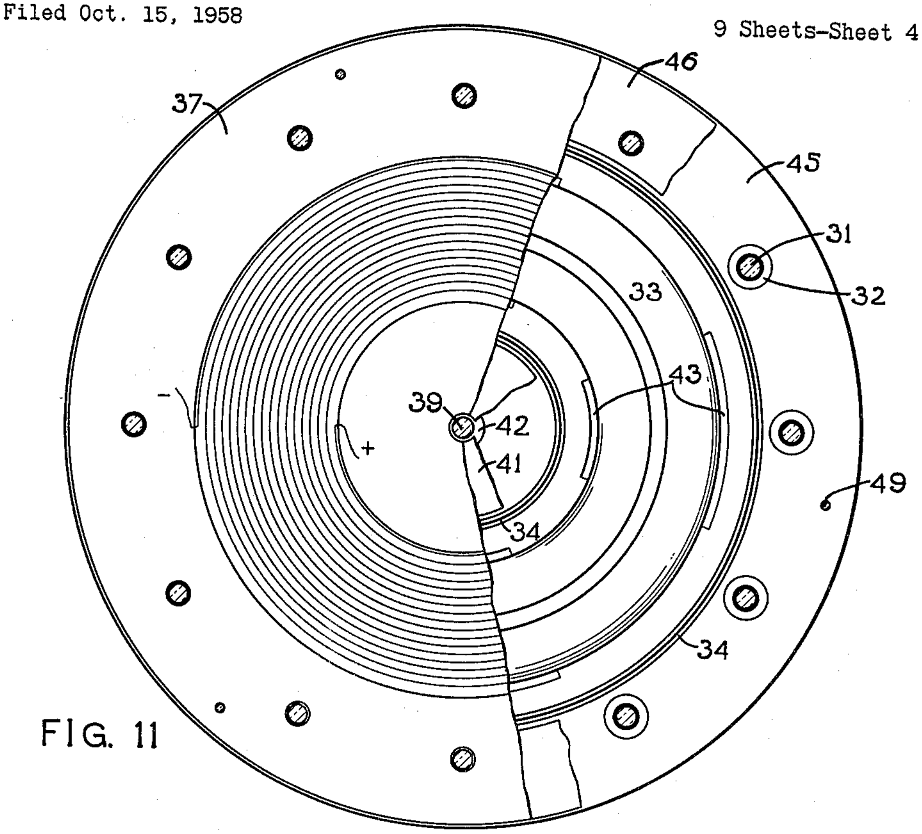
Figures 13, 14:
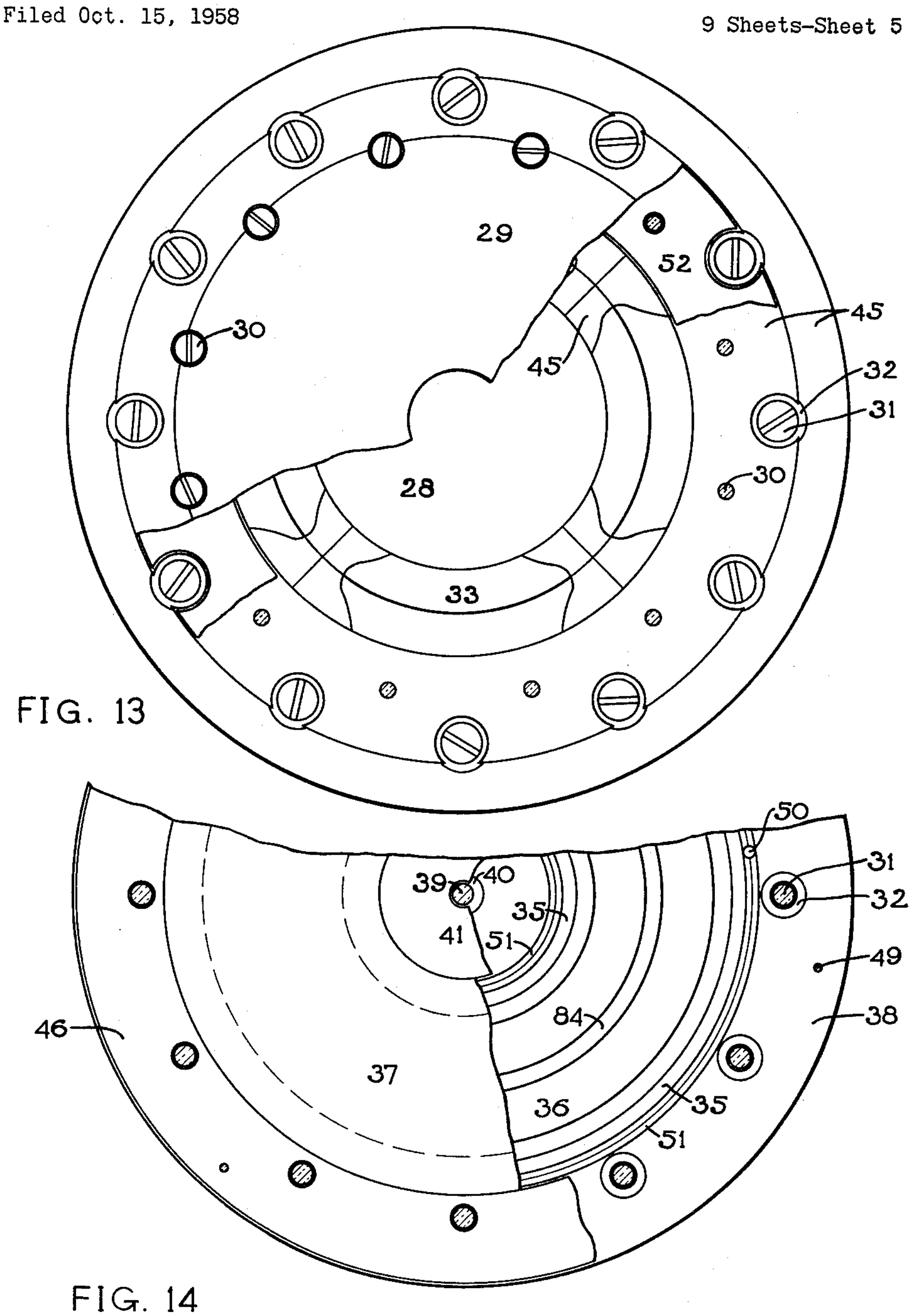
Figure 15:
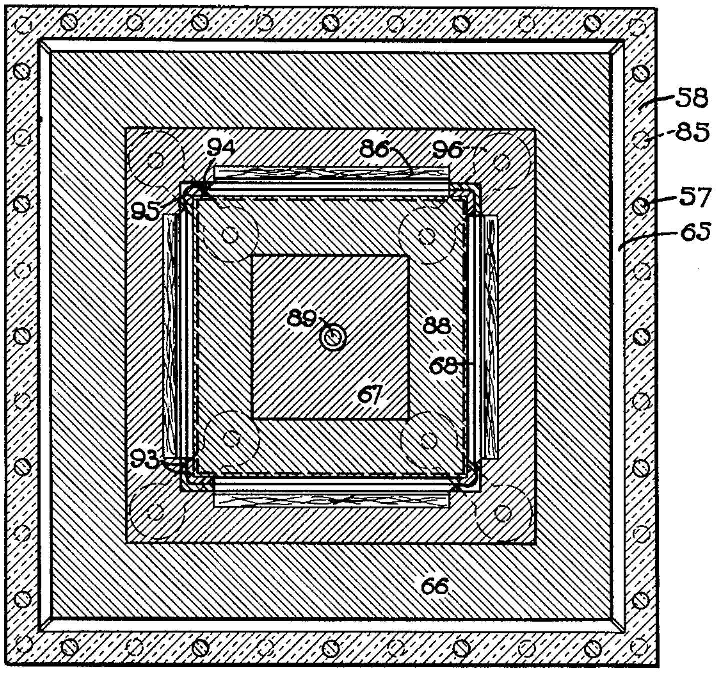
Figures 16, 17:
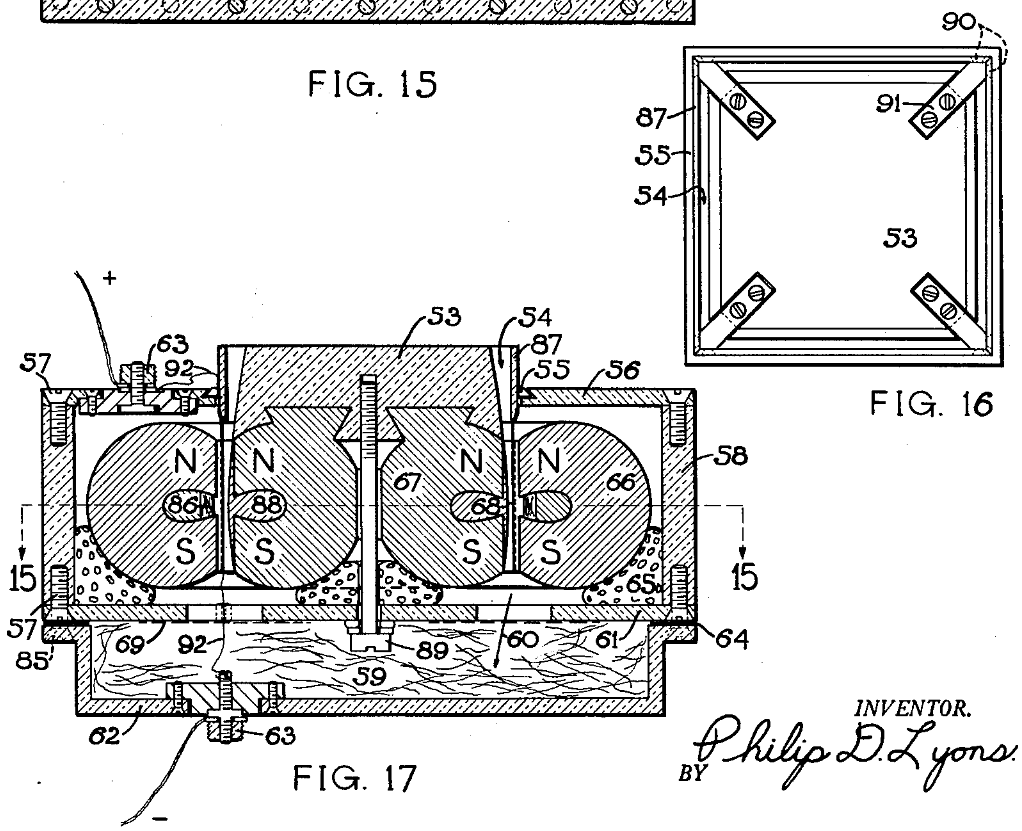
Figure 18:
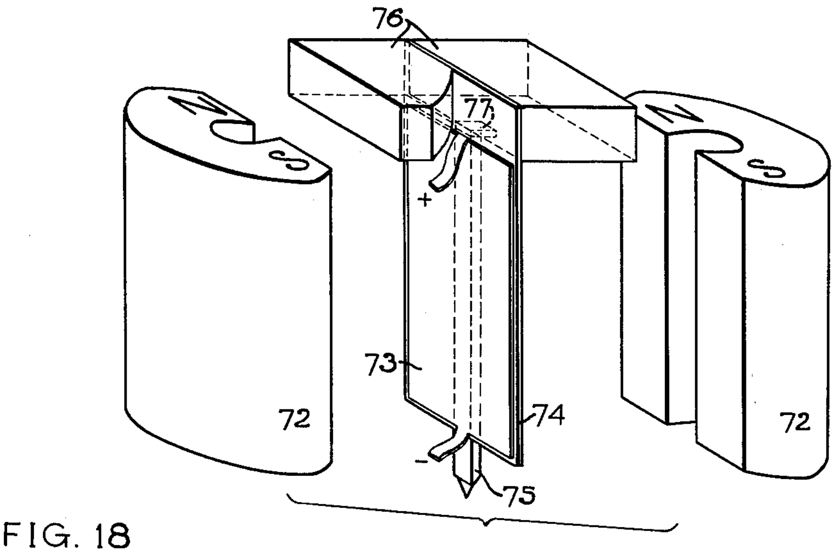
Figure 19:
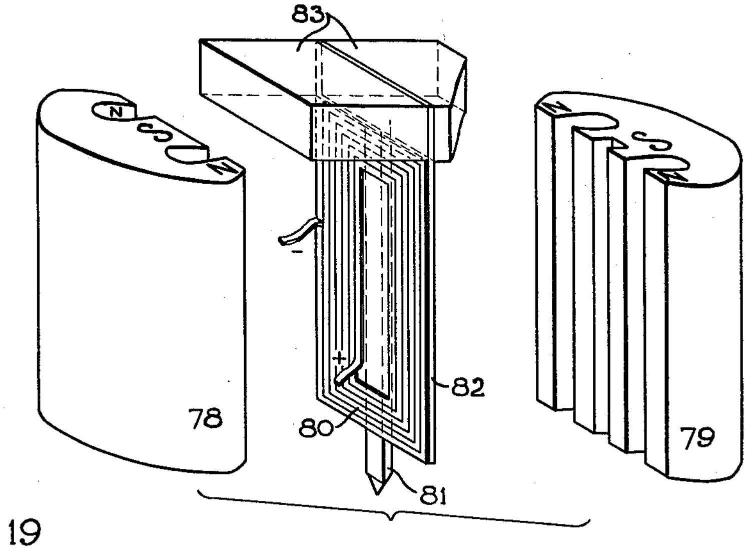
Figure 20:
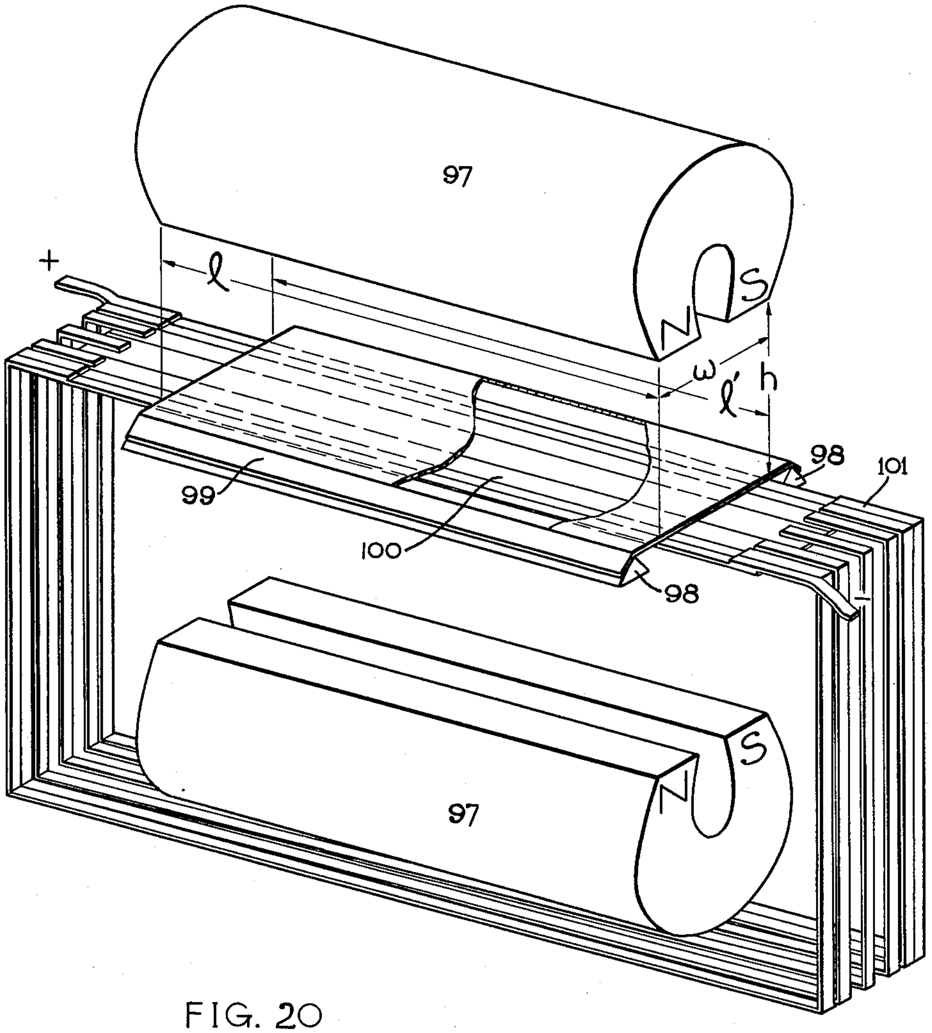
Figure 21:
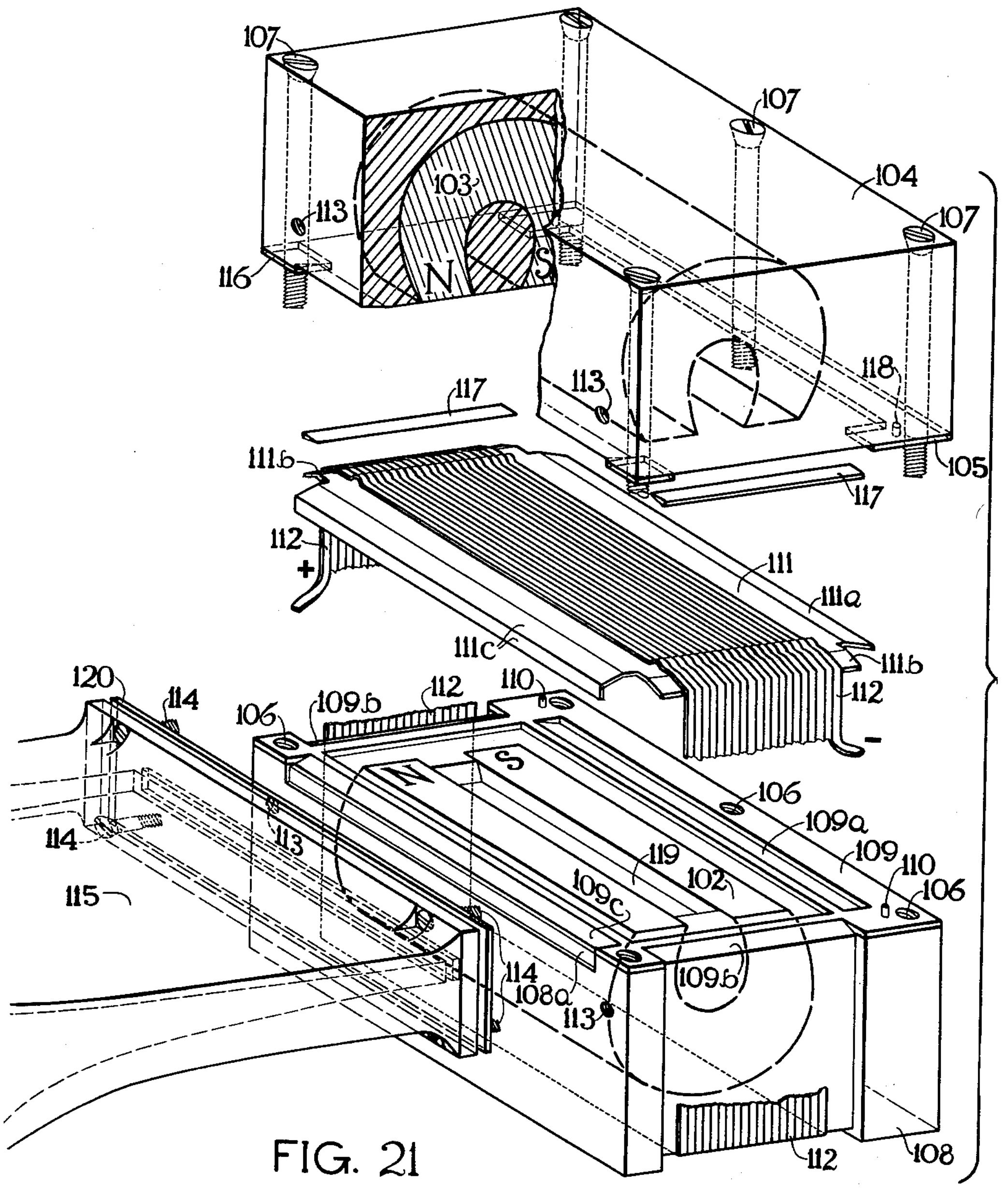

I have prepared nine sheets of drawings containing twenty-one figures to illustrate important uses for and modifications of my opposed magnets design. FIGURES 1 and 2 illustrate the fundamental principles of force and the arrangement of the basic parts on which the operation of my invention depends. FIGURE 3 is a magnified view of one possible construction of the diaphragm-coil assembly. FIGURE 4 is a side view in cross section of a compression-type horn loudspeaker of opposed magnets design. FIGURE 5 is a right sectional cut through a diameter of the magnet casting which contains openings for the radial sound channels. FIGURE 6 is a view looking straight into and down the axis of a horn attached to the driver. FIGURE 7 shows the manner in which the coil is mounted on the diaphragm, and one way of arranging the beginnings of the sound channels which couple the diaphragm to the horn throat as radial slots equally spaced around the poles of the magnet. FIGURE 8 is a bottom view of the magnet shown in FIGURE 5, and FIGURE 9 is a top view of this magnet. FIGURE 10 is a view similar to that of FIGURE 7 but showing the other side of the diaphragm and details of the other magnet. FIG- URE 12 is a side view in cross section of a headphone using the opposed magnets design. A different arrangement of the sound channels from that shown in the horn driver design is the principal difference between the two drawings. These two arrangements can very likely be interchanged or combined; experimentation with these two possibilities is the only way of finding this out. FIGURE 11 shows the coil mounted on the headphone diaphragm and the arrangement of the beginnings of the sound channels around the adjoining magnet. FIGURE 13 is a front view of the earpiece, and a top view of the sound channel magnet where the joining of the outer ends of the concentrically placed sound channels occurs. FIGURE 14 shows a cut portion of the other side of the diaphragm and details of the other magnet. FIGURE 17 is a side view in cross section of a microphone using the opposed magnets design. When my invention is used in microphones as a generator, it is important that the sound waves encounter as little frictional resistance as possible from the walls of the sound entrance channels, and that the diaphragm be suspended in the magnetic air gap as loosely as possible consistent with diaphragm alignment stability, since these factors affect the sensitivity of the microphone. It is also desirable that as much of the diaphragm's surface area as possible have equally direct exposure to the incoming sound waves. Although the utilization of my device as a generator is probably eclipsed by its use as a motor, the former use deserves careful consideration because the diaphragm can be made to use the air gap more efficiently than a ribbon of the same surface area its air gap. FIGURE 16 is the part of the front of the microphone that contains the sound entrance channels, and FIGURE 15 is a section passed parallel to this face and midway between the north-south poles of each of the opposing horseshoe magnets. FIGURE 18 is an exploded isometric view of the essential parts of one possibility of design for a phonograph pickup using the opposed magnets design. The coil has been replaced by a single, wide conductor for simplicity and economy of construction, but the fundamental principles of operation are unchanged. FIGURE 19 is an exploded isometric view of another pickup design possibility in which the magnet design has undergone a simple modification so that a coil instead of a single conductor can be utilized. This latter construction is more efficient and expensive than the former. FIGURE 20 is an exploded isometric view of an arrangement of the opposed magnets design in which only part of the coil operates in the magnetic air gap. This results in some loss of efficiency since the unusued portion of the coil acts as a substantially pure resistance, however, the quality of reproduction should not be inferior to the other arrangement when used in headphone and horn driver applications, and its economy of construction as well as the ease with which the diaphragm can be coupled to an earpiece or horn throat are important advantages. FIGURE 21 is an exploded view showing a possible commercial form for a horn loudspeaker utilizing the design principles of FIGURE 20 for its motor, but showing in this particular example, a signal-conveying coil having windings of unvarying thickness in the magnetic air gap.

FIGURE 2 shows the pattern taken by the magnetic lines of force generated within the air gap formed by two identical horseshoe magnets arranged so that they repel each other. Layers of these orientated and flattened lines of force, substantially parallel to each other and to the pole faces of the two magnets, make up a substantial part of the total magnetic field generated, and on these flattened and orientated magnetic lines of force the operation of my device depends. The apparent direction of the paths of these lines of force near the extremities of the magnetic air gap when the field is generated by a single pair of horseshoe magnets, as in this figure, is unpredictable. A sudden reversal in the apparent direction of the paths of these lines of force is possible and, should this occur, the effect is compensated by a corresponding reversal in the direction of winding that portion of the signal-conveying coil lying in these reversed portions of the field. The regions of the magnetic air gap in which this reversal effect is likely to occur are symbolically shown in approximate location and extensioni by the diminishing arrows proceeding from the two asterisks in this figure. FIGURE 1 shows the directions of the magnetic lines of force generated about a flat, spiral, ring-shaped coil for the two directions of current flow through the coil. With no current flowing through the coil, the coil and secured diaphragm remain centered within the air gap since both are non-magnetic. If current flows in the coil outward from the sheet on which the drawing lies, i.e. towards the reader, the reaction of the magnetic force lines generated by the current flowing in the coil with the magnetic lines of force generated by the magnets and lying in the plane of the surface of the coil will induce an upward electromagnetic force on the coil and consequently, produce an upward motion of the coil and secured diaphragm. If the flow of current in the coil is now reversed, the coil and secured diaphragm will move in the opposite direction for the same reasons. When used as a motor, the opposed magnets design has the desirable characteristics resulting from push pull operation. FIGURE 3 is a possible construction for the diaphragm-coil assembly suitable for the horn driver and headphone applications (shown as a magnified view). The coil 23 is cemented to a surface of a light, thin, heat-resistant support of good insulation properties such as Bakelite 24. The other surface of the support is then cemented to a surface of the diaphragm 25. This diaphragm can be made from a number of light, thin, elastic materials such as mylar plastic, cloth based phenolic, or perhaps a fine silk cloth. If the material does not warp readily from the heat generated by the coil, so much the better. FIGURE 4 represents a compression type horn loudspeaker driver using the opposed magnets design motor. 1 is the throat of a horn attached to the driver by the equally spaced bolts 2. These bolts fit into threaded, brass lined holes (shown but not numbered) embedded in the driver. The driver consists of two main body parts 5 and 7 in which the ring-shaped horseshoe magnets 13 and 12 respectively are embedded. The body parts 5 and 7 are bolted together by the equally spaced brass bolts 4. These bolts are surrounded by the brass jackets 8 which absorb much of the strain produced by the bolts on the material of the body parts. The material of the body parts can be cast Bakelite or Castolite (a thermosetting transparent casting plastic). The gaskets 6 and 17 can be made of pure soft copper; these gaskets establish and maintain the separation distance between the magnets and seal off the sound chambers on either side of the diaphragm. The distance separating the magnets should preferably be only slightly larger than the maximum expected amplitude of the diaphragm's vibrations. The annular diaphragm-backing-coil assembly is located between the magnets so that the coil is in or nearly in the center of the gap, although the coil will operate satisfactorily for any other position in the gap as long as its surface remains substantially parallel to the pole faces and does not contact them in its movements. Shallow grooves 27 concentric with respect to the circumferences of magnet 12 are turned in body part 7. The dull-pointed brass rings 14 are threaded into body part 5 and provide down bearing for the diaphragm 16 against the pressure bar rings 15. These pressure bar rings are concentric with the rings 14 and are threaded into body part 7; they establish and maintain the spacing of the diaphragm 16 between the magnets 13 and 12. Three equally spaced peepholes 26 provide a check on the alignment of the rings 14 with their grooves 27, and three equally spaced and situated brass dowel pins 22 provide accurate, permanent, and easy alignment of the body parts 5 and 7. Brass bolt 11 insures the good contact of body parts 5 and 7 against the gasket 17. This bolt fits into a threaded brass socket 18 which is embedded in body part 5. The sound channels 19 and the projections 20 can be cast integral with body part 5 by the use of suitably formed cores; another alternative would be to form these parts from brass, sheet metal inserts which could be made to adhere to the body part 5 when it is being cast by roughening the surfaces of the inserts where they are to adhere to the casting material. The sound channels 19 can have a taper rate continuous with that of the horn 1. The purpose of the projections 20 is to form a smooth, gradual, acoustic transistion from the rectangular cross sections of the sound channels 19 to the circular cross section of the horn throat. The leads 9 of the diaphragm coil are brought through drilled out passages in body part 7 to the terminal screws 10, the screws being threaded into body part 7. The sound absorbent material 21 serves to subdue sound resonances within the chamber at the back of the diaphragm that might otherwise interfere with the movements of the diaphragm. The magnet 12 could contain radial slots (similar to those shown in magnet 13) lined with sound absorbent material in addition to the volume containing 21 if that extra volume is needed. The exact amount of such sound absorbing material needed can best be ascertained by listening tests conducted on the finished model.

Figure 12:
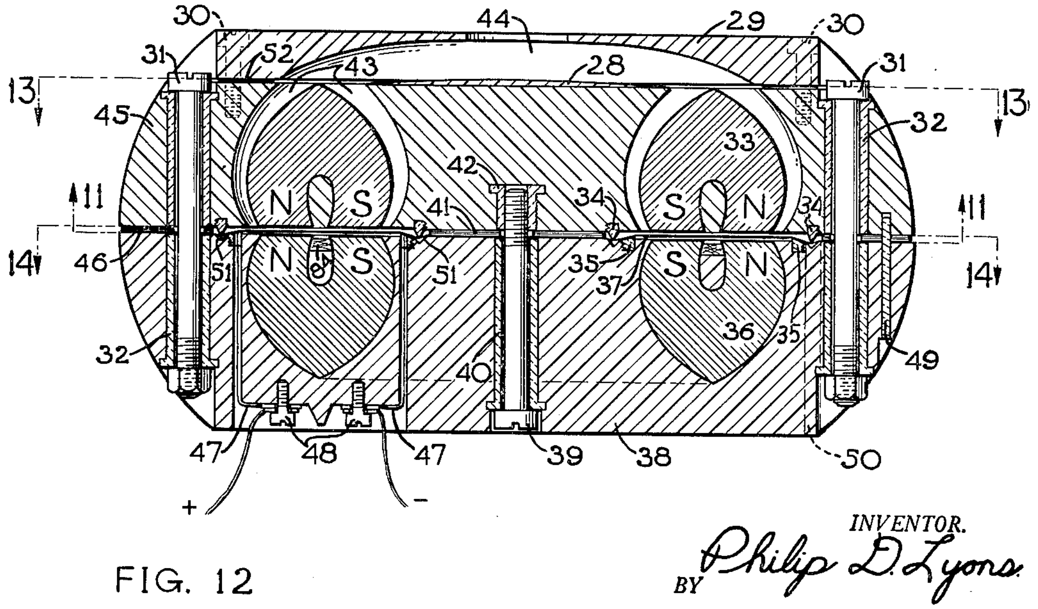

The side view of a headphone using the opposed magnets design is shown in cross section in FIGURE 12. The magnets 33 and 36 are embedded in the body parts 45 and 38 respectively. These body parts can be cast from Bakelite or Castolite and are bolted together by the equally spaced brass bolts 31. These bolts are jacketed by the brass casings 32 which prevent pressure exerted by the bolts from possibly cracking the body parts. The spacing of the body parts 45 and 38, and consequently the spacing of the magnets, is determined by the thickness of the soft, pure copper gaskets 41 and 46. The brass bolt 39 is equipped with a brass casing 40 and fits into the threaded, brass lined socket 42. This bolt insures good contact of the body parts against the gasket 41. The unusual shape of the outer side surfaces of magnet 33 enables these surfaces to form one of the main sides of the sound channels 43. The outside surfaces of magnet 36 need only be rough ground to this shape. The diaphragm with its coil assembly 37 is pressed down on the brass pressure bar rings 35 by the dull-pointed brass rings 34. Rings 34 are threaded into body part 45 and the pressure bar rings 35 are threaded into body part 38. The pressure bar rings 35 establish and maintain the spacing of the diaphragm between the two magnets 33 and 36. Grooves 51 are turned in body part 38 to allow the points of the rings 34 to project below the surface of this body part. Three equally spaced peepholes 50 afford a visual check on the alignment of the pointed rings 34 with their grooves 51. This alignment is permanently maintained by the equally spaced brass dowel pins 49. The leads of the coil are brought through drilled out passages in body part 38 and fastened to the terminal screws 48 which are threaded into the body part. The sound absorbent material 84 subdues resonances in the cavity behind the diaphragm preventing these resonances from interfering with the movements of the diaphragm. The earpiece cap 29 can be cast of the same material as the body parts and is bolted to body part 45 by the equally spaced brass bolts 30; the gasket 52 affording a tight seal between these pieces. The piece 28 can be of the same material as the body parts and is cemented to body part 45. This construction facilitates grinding the flat surface of body part 45 to which the earpiece cap 29 is bolted.

FIGURE 17 is a side view in cross section of a microphone using a generator of opposed magnets design. The magnets 66 and 67 are placed so that they repel each other, thereby setting up layers of flattened and orientated magnetic force lines in the magnetic air gap between the poles of the magnets that are substantially parallel to each other and the pole faces of the magnets. A tube-shaped diaphragm with inner and outer surfaces and having a helical signal-conveying coil wound over a surface 68 is placed within this gap so that the surfaces of the diaphragm and the coil are parallel to the pole faces of the magnets. The coil on the diaphragm is wound so, that when at rest, it always cuts the flattened and orientated magnetic force lines generated by magnets 66 and 67 and lying on its surface at substantially an angle of 90° and in the same direction relative to the paths of the magnetic lines of force. Any movement of the diaphragm, due to sound waves passing through the sound entrance channels 54 and striking the diaphragm, will cause the attached coil to cut across the layers of magnetic force lines generated by the magnets at substantially an angle of 90° and thereby induce a uniformly directed current to flow through the coil. The direction of current flow in the signal-conveying coil depends on the direction in which the coil cuts across the flattened and orientated magnetic lines of force relative to the paths or directions of these cut lines of force. For a vibrating coil caused by sound waves impinging on the diaphragm, an alternating signal current electrically equivalent to the impinging sound waves will be induced in the coil. The leads 92 of the coil are brought out to the terminal screws 63 (which are insulated from the casing of the microphone). In FIGURE 15 the magnets 66 and 67 are spaced by the two pairs of L-shaped inserts 93, located at diagonal corners of the magnets. The diaphragm is sandwiched between each pair of these inserts and rigidly held there. Tension is applied to the diaphragm by the two blocks 95 which act as wedges and are located at the other two diagonal corners. The triangular shaped blocks 94 give a downbearing to the diaphragm and determine each vibrating length of the complete diaphragm as well as the centering of the diaphragm in the gap. The diaphragm will operate well anywhere in the gap as long as its surfaces remain substantially parallel to the pole faces of the magnets, but care must be taken that it does not strike the pole pieces during its greatest amplitude of vibration. Members 93, 94, and 95 should be made of a material that has good insulation properties such as Bakelite. If the coil is cemented too tightly to the diaphragm, it will break when the diaphragm is stretched; a flexible-setting cement should therefore be used. After the spacing of magnets 66 and 67 is obtained, the magnets are prevented from sliding apart by the four brass bars 96 (shown in FIGURE 15) which are fastened to the magnets with screws that fit into expandable lead plugs which, in turn, fit into holes in the magnets left by cores when the magnets were cast. These bars are tightened up after the correct spacing of the gaps is achieved by the inserts 93. Magnets 66 and 67 should preferably be cast in one piece if this does not hamper the subsequent surfacing of their pole faces. The brass main sound entrance channel plate 53 can be cast directly onto the side of magnet 67. The raised, regularly spaced bosses on this side of the magnet form a dovetail joint with the plate 53. A non-magnetic material 88 is poured into the space between the poles of the magnet 67 and allowed to cover the surfaces of its poles as shown in FIGURE 17. The material 88 is welded, soldered, or otherwise made to adhere to member 53, and the surfaces are finished together to form the curved, continuous surface which conveys the sound waves to and then away from the diaphragm into the sound absorbent volume 59. The pole faces of magnet 67 can be slightly roughened to improve their adherence to the material 88. It is, of course, important that material 88 does not shrink too much upon setting or cooling. The four brass plates 87 form the other main surface of the sound entrance channels 54, and they can be spot welded 90 to the four corner supports-and-spacers 91 which are in turn screwed to the member 53. The two magnets 66 and 67, the sound entrance channel structure 53, 87 and 91, and the diaphragm-coil structure 68 form a rigid assembly that is insulated by the rubber shock absorbers 55 and 65 from the microphone casing assembly. The casing assembly consists of the brass front face plate 56 (which is square with a square punched-out portion in its center), the brass side plate 58, the brass back plate 61, and the brass back cover plate 62 (forming the sound absorbent chamber 59). A gasket 64 affords a tight seal between members 62 and 61, and a screen 69 prevents the sound absorbent material from getting into the magnetic air gap. A bolt 89, isolated from member 61 by a live rubber washer, holds the magnet-coil-sound entrance channel assembly against the rubber shock absorbers 65. The arrow 60 shows the path of the sound waves through holes in plate 61 going into the chamber 59 after these waves have dissipated some of their energy in moving the diaphragm. 86 is sound absorbent stripping that subdues any resonances that might interfere with the diaphragm movements. An edge of the diaphragm is attached flexibly to members 87 so that all of the incoming sound waves are directed against the diaphragm (shown in FIGURE 17).

FIGURES 18 and 19 are exploded isometric views, in which the spacing of the magnets is exaggerated for clarity of presentation, of two possible constructions for a phonograph pickup using an opposed magnets design generator; the commercial form of these two constructions would necessitate securing the magnets 72 and the clamping blocks 76 together into a unitary structure, and similarly for magnets 78, 79, and the clamping blocks 83. For example, these parts could be embedded in plastic, in fixed, spaced relation to each other; the spacing of the magnets being preferably only scarcely larger than the maximum amplitude of vibration of the backing-coil or backing-conductor assembly in the magnetic air gap between the poles of the magnets. The magnets 72 and the magnets 78 and 79 are, in both instances, arranged with their facing like poles parallel to, and substantially coextensive with, each other thereby forming magnetic air gaps having flattened and orientated magnetic lines of force between, and parallel to, the poles of the magnets. In FIGURE 18 the Bakelite or plastic backing 74, which stiffens the signal-conveying conductor 73 so that it can be supported in the magnetic air gap, contains a single strip of aluminum foil 73 cemented to a surface. The surfaces of the backing 74 and its attached conductor or foil 73 coextend with the extent of the magnetic air gap formed between the poles of magnets 72 and are substantially parallel, when at rest, to the facing poles of the magnets and the flattened and orientated magnetic lines of force generated by the magnets. A light, metal, D-shaped tube 75 is cemented with its flattened side along the central axis of and to the other surface of the backing. The upper edge of the backing is restrained by the two blocks 76 while the lower edge is free to move in a direction perpendicular to the surface of the backing. A thin rubber or nylon pad 77 can be placed between the end of the tube 75 and the block 76 it faces. This pad 77 acts as a shock absorber for the diamond tip (in the other end of the tube) in case the cartridge is accidentally dropped roughly onto a record, and also serves to center the backing in the magnetic air gap and dampen the movements of the backing. The leads of the conductor 73 would be taken out to terminal posts located conveniently on the outside of the case of the cartridge. Any movement mechanically impressed on the backing 74, by the stylus engaging a moving record groove and transmitting the mechanical vibrations picked up to its tube, causes the attached signal-conveying conductor 73 to everywhere cut across the magnetic lines of force generated by the magnets at substantially an angle of 90° and in the same direction relative to the paths or directions of the flattened and orientated magnetic lines of force this induces a uniformly directed current to flow in the conductor, the direction of current flow depending on the direction of movement of the backing-coil assembly as in the case of the microphone design. In the phonograph cartridge design of FIGURE 19, a signal-conveying coil 80 is utilized to generate the current. The E-shaped magnets 78 and 79 can each be thought of as the equivalent of two horseshoe magnets with one like pole of each joined. Each of these joined magnets furnishes a flattened and orientated magnetic force line field for one of the long sides of the coil. When at rest, the coil has its windings arranged to cross the flattened and orientated magnetic lines of force lying on its surface at substantially a 90° angle and always in the same direction relative to the paths or directions of these lines of force so that the signal current generated in the coil 80 moves in a uniform direction through the coil for a given direction of coil displacement. The short sides of the coil are not used to generate any current, but the magnets 78 and 79 could quite easily be modified further so that these short portions of the coil could also generate current. Whether the small gain in efficiency is worth the extra care in casing and finishing the additional modifications of the magnets remains to be seen. The blocks 83, the backing 82 and the light, metal, D-shaped tube 81 serve the same purposes as the parts 76, 74 and 75 of FIGURE 18. The middle pole of magnet 79 has a groove ground down its length to accommodate the tube 81 so that a close spacing of the poles with the backing-coil assembly is possible. The magnets are placed with their pole faces parallel to the surfaces of the backing-coil assembly. Exact centering of the coil in the magnetic air gap is unnecessary, but the centering of parts 80 and 82 combined would result in the smallest air gap possible. The design of FIGURE 18 is simpler in construction and is hence more economical to build than the design of FIGURE 19, but this latter design should be more efficient. The pad 77 of FIGURE 18 is not shown in the design of FIGURE 19 to simplify the drawing, but it can be used in both designs.

FIGURE 20 is an opposed magnets motor-generator design in which only a portion of the signal-conveying coil (the portion 100 attached to the diaphragm 99) is is used within the magnetic air gap. This construction enables straight horseshoe magnets 97 to be used rather than the more complicated ring-shaped horseshoe magnets. The magnets 97 (the separation of which are exaggerated) form a magnetic air gap having flattened and orientated magnetic lines of force—as in FIGURE 2. The part of the coil 100 is supported by the diaphragm 99 so that it is substantially parallel with the poles of the magnets 97 and the flattened and orientated magnetic lines of force generated by the magnets and is arranged so that a current passing in either direction through the entire coil (consisting of portions 100 and 101) would everywhere cut the flattened and orientated magnetic lines of force at substantially a 90° angle and in the same direction relative to the directions or paths of the lines of force. It will be noticed that the wire or ribbon of the coil not in the gap (101) can be thickened to decrease resistance losses through the coil. A further refinement shown in this design, but equally applicable to the other designs, is the variable thickness of the windings in that portion of the coil (100) within the magnetic air gap. This variation of thickness in the individual windings or turns of the coil permits a larger or smaller number of coil turns to be closely wound over a unit width of the diaphragm. By increasing the number of individual coil turns per unit coil width in those regions across the coil width lying in relatively weaker portions of the magnetic field and decreasing the number of individual coil turns per unit coil width in those regions across the coil width lying in relatively stronger portions of the magnetic field, it is possible to compensate for any inequalities of the magnetic field strength at different points across the magnetic air gap in any given plane susbtantially parallel to the pole faces of both magnets, and permits a more uniform driving or dampening force to be applied over every point on the diaphragm; by using a coil of variable winding thickness within the magnetic air gap of the microphone design or phonograph pickup design of FIGURE 19 already discussed, it will be possible to adjust the electromagnetic dampening on the coil and its diaphragm to these variations in the magnetic field strength since the dampening and driving forces depend on the same conditions under which the current in the coil is made to interact with the magnetic lines of force in the air gap. The diaphragm 99 is stretched over and is given a down bearing on the bars 98. The diaphragm can be clamped at the edges along its width a little beyond the ends of the magnets 97. An important advantage of this construction is the ease and directness with which the sound chamber volume l·w·h can be coupled to the throat of a horn or to an earpiece at either of the areas l·h or l′·h or at both areas. FIGURE 21 is an exploded view showing a horn loudspeaker utilizing an opposed magnets motor design similar to that of FIGURE 20 in that only a portion of the signal-conveying coil is secured to the diaphragm within the magnetic air gap. The permanent magnets 102 and 103 are embedded in the Bakelite body parts 108 and 104 respectively, with their pole surfaces flush with the surfaces of said body parts. Body part 108 is provided with five tapped holes 106 into which the five similarly distributed brass bolts 107 of body part 104 can be screwed to bring the facing like poles of the magnets 102 and 103 into fixed proximity. The thickness of the soft copper gaskets 105, 116, and 109, determines the separation of the facing poles of the magnets 102 and 103, and the brass dowel pins 110 of body part 108 fit into their corresponding holes 118 in body part 104 thereby eliminating the possibility of lateral play between these body parts after they are screwed together. The diaphragm 111, to which the copper or aluminum helical signal-conveying coil 112 is wound over and secured, is supported between, and parallel to, the facing poles of the magnets 102 and 103 by bending down and securing the diaphragm's edge flaps 111*a*, 111*b*, and 111*c*, to the facing, corresponding beveled portions 109*a*, 109*b*, and the portion made up of surfaces 109*c* and 108*a*—all located on body part 108. A heat-resistant support for the signal-conveying coil can be secured to and placed between the coil 112 and the diaphragm 111—as shown in FIGURE 3 of the drawings; this support, however, is not necessary, especially if the signal-conveying coil is not expected to convey heavy currents that might raise its temperature high enough to damage the diaphragm. The portion of the coil 112 not being utilized within the magnetic air gap can be wound around and secured to the body part 108 as shown (partly in dotted outline) in the figure. Securing the diaphragm 111 to the body part 108 should be done in a way to provide an air-tight separation between the coil-bearing front surface of the diaphragm and its back surface. The back surface of the diaphragm (facing the poles of magnet 102) radiates acoustic energy, when vibrating, into a closed chamber (bounded by the back surface of diaphragm 111, gasket 109, magnet 102, and body part 108); a volume of space 119 can be provided between the poles of magnet 102 and lined or filled with a sound-absorbent material to reduce the possibility of resonance effects building up and interfering with the vibrations of the diaphragm. Acoustic energy radiated from the front surfaces of the diaphragm 111 and coil 112 into the sound chamber (bounded by said front surfaces 111 and 112, magnet 103, body part 104 and gaskets 105, 116, and 117) is channeled through the initial horn expansion commencing on the body parts 104 and 108 (the initial expansion being represented on body part 108 by the sloping surface 109*c* to which the flap 111*c* is secured) into the throat of a horn; in the figure—horn 115. The brass bolts 114 of the horn are screwed into the corresponding, facing, tapped holes 113 in the body parts 108 and 104 (after the body parts are screwed together to form the driver) so that the throat of the horn 115 is acoustically coupled to the initial horn expansion commencing in the driver. The cork gasket 120 assures a tight acoustic coupling between the driver and the horn 115. The leads of the signal-conveying coil 112 (designated by the plus and minus signs) can be brought out in any convenient manner to terminal posts which can be secured to an outside surface of the body part 108 for direct connection to the output transformer of an amplifier.

I would now like to devote a few paragraphs to pointing out some methods by which the horn loudspeaker driver of FIGURE 4 using my opposed magnets motor design might be finished and assembled using ordinary factory tools and machines. The first step would be the casting of the body parts 5 and 7 (shown in FIGURE 4). The material used in this casting could be Bakelite or Castolite. The brass jackets around bolts 4 and 11, the threaded brass sockets of bolts 11 and 2, the sound channels 19 and projections 20, and the magnets 12 and 13 are all embedded into the two body parts at the time of the casting. The sound channels 19 and projections 20 can either be formed from suitable cores in the casting molds for the body parts or formed by brass, sheet metal inserts (with the sides that are to adhere to the casting material roughened). The casting material of the two body part castings should more than just cover the pole surfaces of magnets 12 and 13. The casting should then be cured (this is usually done by heat treatment in the case of plastics) so that dimensional stability of the casting is insured. The material covering the pole faces of the magnets 12 and 13 can now be turned or ground away to within about a sixteenth of an inch of these pole faces. The body parts 5 and 7 are then placed upon a grinding machine similiar to that used by optical companies to turn out optical flats, and by using increasingly finer grades of abrasive, a flat, polished surface consisting of the magnet pole faces and the surrounding casting material is obtained. The opposite flat surface of each of the body parts can then be ground and polished. Each of the body parts is now mounted on an engine lathe and lined up in the jaws of a chuck so that the grooves 27 and the threaded channels for the rings 14 and the pressure bar rings 15 can be turned out. Some space between the poles of magnet 12 can also be turned out at this time. The rings 14 and 15 are now threaded on another engine lathe and screwed tightly into their channels on the body parts with a spanner wrench. These rings are then turned down to the desired shape and size, always turning the rings in the opposite direction to that in which they were screwed into the body parts so they aren't loosened but tightened further. The points of rings 14 and the corners of rings 15 should now be smoothed by burnishing them so they won't tear the diaphragm. One way of making the coil is as follows. A sheet of aluminum foil is cemented to a thin, light, heat resistant, backing possessing good insulation properties such as heat resistant Bakelite; these parts correspond to parts 23 and 24 of FIGURE 3. The aluminum foil sheet is pressed down absolutely flat on the backing by putting the aluminum sheet and backing together into a press immediately after cementing them. This backing-coil assembly can then be temporarily cemented to a flat face plate and mounted on an engine lathe equipped with a cross-cutting feed. A diamond pointed cutting tool could then be used to cut out a ribbon coil of any desired width in the aluminum foil. By varying the feed speed during the cutting process, a ribbon coil of varying width (similar to that shown in FIGURE 20) could be cut out. The depth of cut must be accurately maintained so that the foil 23, but not its backing 24, is completely cut through. The backing 24 is then cemented to the diaphragm 25 (FIGURE 3) and the entire diaphragm-backing-coil assembly is put in a press and flattened out.

The edges of the rectangular, radial sound channel slots on the surface of body part 5 should probably be slightly smoothed by burnishing them, but only a hearing test of the completed driver can decide the value of this treatment. The soft, pure copper gaskets 6 and 17 are now cemented to body part 5 using a cement that will not mar the polished surface of the body part should the gaskets have to be removed in the future. The two body parts 5 and 7 are now bolted together with bolts 4 and 11 using a torque wrench to achieve a uniform stress on the body parts and the gaskets; the diaphragm is not placed in the driver at this time. After the cement on the gaskets 6 and 17 has hardened, the alignment of the largest pointed ring 14 with its groove 27 can be checked visually by looking through the three equally spaced peepholes 26 (previously drilled out) with an instrument similar to that a physican uses in looking into ears. The bolts 4 and 11 are loosened and any adjustments in alignment are made by shifting the body parts, then the bolts are retightened with the torque wrench and the alignment once again is checked. Three equally spaced holes are now drilled through body part 7, the gasket 6, and an eighth of an inch or so into body part 5. A little cement is dropped into the holes in body part 7 and the brass dowel pins 22 can then be tapped into place. The body parts are now separated, the diaphragm assembly placed on body part 7, and the leads of the coil brought through the lead channels (previously drilled out in this body part). Holes are cut in the diaphragm to accomodate the brass dowel pins 22 and the bolts 11 and 4. The alignment of the diaphragm is checked and is maintained by the dowel pins 22. The edges of the diaphragm are now cemented to body part 7 using the non-marring cement and when this cement has dried, the uncemented sides of the gaskets 6 and 17 are coated with the above-mentioned cement. The body parts 5 and 7 are now bolted together again with the torque wrench. The magnets 12 and 13 should be mangetized just before the final installation of the diaphragm assembly and the leads of the coil are attached to the terminal screws 10. This completes the assembly of the driver. For the most part, the assembly and construction of the headphone, phonograph cartridge and microphone can be made using procedures similar to those just discussed.

What I claim as my invention is:

1. An electromagnetic transducer for the translation of sound comprising a pair of reflexed bipolar magnets, a signal-conveying coil, a diaphragm and means supporting said magnets with their like poles facing and separated to provide a magnetic air gap therebetween having a field of flattened and orientated magnetic lines of force; said coil being wound over and secured to said diaphragm, and support means provided for suspending said diaphragm and coil in said gap so that the surfaces of said diaphragm and said coil within said gap are substantially parallel to the flattened said lines of force; said coil surface within said gap being substantially coextensive with the flattened portion of said field and being orientated with said field in such manner that a current conveyed in either direction through said coil would, everywhere, cut the magnetic lines of force generated by said magnets and lying on the surface of said coil at a substantially right angle and in the same direction relative to the directions of said lines of force.

2. The transducer of claim 1 in which the signal-conveying coil is additionally provided with a variable thickness in its individual turns thereby permitting a larger number of closely wound individual coil turns for that portion of the coil's width lying within regions of relatively low magnetic field strength and permitting a smaller number of closely wound individual coil turns for that portion of the coil's width lying within regions of relatively high magnetic field strength; whereby the electromagnetic force operating on the coil due to a signal current in said coil is made, per unit coil width, substantially independent from any variations in the magnetic field strength at different points across the magnetic air gap in any given plane substantially parallel to the pole faces of the repelling magnets.

3. An electromagnetic generator mechanism for utilization within a microphone comprising, in combination, a pair of repelling horseshoe magnets having spacing means and arranged with their like poles facing thereby forming a magnetic air gap having flattened and orientated magnetic lines of force between the poles, a substantially tube-shaped diaphragm having an inner and an outer surface, and a helical signal-conveying coil wound over and secured to a surface of said diaphragm; the length of said gap bending back on itself forming a closed polygon by placing the said horseshoe magnets one within the other such that the surfaces of the north pole of one of the two said magnets face and are parallel to the corresponding surfaces of the north pole of the other said magnet, and the surfaces of the south pole of one of the two said magnets face and are parallel to the corresponding surfaces of the south pole of the other said magnet—the facing, corresponding said poles being substantially mutually coextensive; said diaphragm having supporting means for suspension within said magnetic air gap so that the surfaces of said diaphragm and said secured coil are substantially parallel to the facing pole surfaces of both said magnets and to the said flattened and orientated magnetic lines of force, and said coil having its windings coextensive with said flattened and orientated magnetic lines of force and arranged, when at rest, to everywhere cross said lines of force lying on its surface at substantially a right angle and in the same direction relative to the paths of said lines of force so that any sound waves impinging on said diaphragm will cause said secured coil to cut across said flattened and orientated magnetic lines of force, thereby inducing a uniformly directed current to flow in said coil.

4. An electromagnetic transducer for the translation of sound comprising a diaphragm, a signal-conveying coil wound over and secured to said diaphragm, a pair of repelling horseshoe magnets, and means supporting said magnets with their poles separated to provide for a magnetic air gap having flattened and orientated magnetic lines of force between, and substantially parallel to, the poles of the magnets; said diaphragm and said coil being means suspended in said magnetic air gap, and said magnets being placed so that the north pole of one of the two said magnets faces and is substantially coextensive with and parallel to the north pole of the other said magnet, and the south pole of one of the two said magnets faces and is substantially coextensive with and parallel to the south pole of the other said magnet; said coil having its surface within said gap substantially coextensive with the flattened portion of said lines of force and parallel to the pole faces of both said magnets when at rest, and arranged so that a current passing in either direction through said coil would cut substantially normally across, and always in the same direction relative to, the paths of the said flattened and orientated magnetic lines of force generated by said magnets and lying on said coil surface, and thereby cause a uniformly distributed and directed electromagnetic force to be applied over said coil and, consequently, over said diaphragm.

5. The transducer of claim 4 in which the signal-conveying coil is additionally provided with a variable thickness in its individual turns thereby permitting a larger number of closely wound individual coil turns for that portion of the coil's width lying within regions of relatively low magnetic field strength and permitting a smaller number of closely wound individual coil turns for that portion of the coil's width lying within regions of relatively high magnetic field strength; whereby the electromagnetic force operating on the coil due to a signal current in said coil is made, per unit coil width, substantially independent from any variations in the magnetic field strength at different points across the magnetic air gap in any given plane substantially parallel to the pole faces of the repelling magnets.

6. An electromagnetic generator mechanism for utilization within a microphone comprising a diaphragm, a signal-conveying coil wound over and secured to said diaphragm, and a pair of repelling horseshoe magnets having spacing means that provide for a magnetic air gap having flattened and orientated magnetic lines of force substantially parallel to and between the poles of the magnets; said diaphragm and said coil being means suspended in said magnetic air gap, and said magnets being placed so that the north pole of one of the two said magnets faces and is substantially coextensive with and parallel to the north pole of the other said magnet, and the south pole of one of the two said magnets faces and is substantially coextensive with and parallel to the south pole of the other said magnet; said coil having its surface within said gap substantially coextensive with the flattened portion of said lines of force and parallel to the pole faces of both said magnets when at rest or in motion, and having its windings everywhere cross the flattened and orientated magnetic lines of force lying on its surface, when at rest, at substantially a right angle and in the same direction relative to the paths of said lines of force, and arranged to respond to sound waves impinging on said diaphragm by everywhere cutting across the flattened and orientated magnetic lines of force generated by said magnets thereby inducing a uniformly directed current to flow in said coil.

7. An electromagnetic generator mechanism for utilization within a phonograph pickup comprising a pair of repelling horseshoe magnets having spacing means and arranged with their like poles facing thereby forming a magnetic air gap having flattened and orientated magnetic lines of force between the poles of the magnets, a signal-conveying conductor having stiffening means, and pivot-supported actuating means for said conductor terminating in a stylus; said conductor being secured to and supported by said actuating means within said magnetic air gap, and said conductor being substantially coextensive with and parallel to said flattened and orientated magnetic lines of force so that any vibratory acoustic energy mechanically impressed on said stylus will everywhere cause said secured conductor to cross said flattened and orientated magnetic lines of force in the same direction relative to the paths of said magnetic lines of force for a given direction of displacement of the vibrated conductor, thereby inducing a uniformly directed signal current corresponding to said impressed acoustic energy in said conductor.

8. An electromagnetic generator mechanism for utilization within a phonograph pickup comprising a pair of repelling E-shaped magnets having spacing means and arranged with their like poles facing thereby forming a magnetic air gap having flattened and orientated magnetic lines of force between the poles of the magnets, a signal-conveying coil having stiffening means, and pivot-supported actuating means for said coil terminating in a stylus; each said magnet being magnetized so that its middle pole is north and its end poles south, or vice versa; said coil being secured to and supported by said actuating means within said magnetic air gap, and said coil being in said gap substantially coextensive with and parallel to said flattened and orientated magnetic lines of force and having its windings arranged, when at rest, to cross everywhere the said lines of force lying on the surface of said coil at substantially a right angle and in the same direction relative to the paths of said flattened and orientated magnetic lines of force so that any vibratory acoustic energy mechanically impressed on said stylus will cause said secured coil to cut said flattened and orientated magnetic lines of force and for a given direction of displacement of the vibrated coil, induce a uniformly directed signal current corresponding to said impressing acoustic energy to flow in said coil.

9. The electromagnetic generator mechanism of claim 8 in which the signal-conveying coil is additionally provided with a variable thickness in its individual turns thereby permitting a larger number of closely wound individual coil turns for that portion of the coil's width lying within regions of relatively low magnetic field strength and permitting a smaller number of closely wound individual coil turns for that portion of the coil's width lying within regions of relatively high magnetic field strength; whereby the electromagnetic dampening force operating on the coil is made, per unit coil width, substantially independent from any variations in the magnetic field strength at different points across the magnetic air gap in any given plane substantially parallel to the pole faces of the repelling magnets.

10. An electromagnetic motor mechanism for utilization within a receiver or horn loudspeaker driver comprising, in combination, a pair of repelling ring-shaped horseshoe magnets having spacing means and arranged with their like poles facing thereby forming an annular magnetic air gap having flattened and orientated magnetic lines of force between the poles, a flat, ring-shaped diaphragm, and a flat, spiral, signal-conveying coil wound over and secured to a surface of said diaphragm; said ring-shaped horseshoe magnets being placed so that the ring-shaped surface of the north pole of one of the two said magnets faces and is parallel to the ring-shaped surface of the north pole of the other said magnet, and the ring-shaped surface of the south pole of one of the two said magnets faces and is parallel to the ring-shaped surface of the south pole of the other said magnet—the facing said poles being substantially mutually coextensive; said diaphragm having supporting means for suspension within said magnetic air gap so that the surfaces of said diapragm and said secured coil are substantially parallel to the facing pole surfaces of both said magnets and to the said flattened and orientated magnetic lines of force, and said coil having its windings coextensive with said flattened and orientated magnetic lines of force and arranged, when at rest, to everywhere cross said lines of force lying on its surface at substantially a right angle and in the same direction relative to the paths of said lines of force so that a signal current passed in either direction through said coil will produce an evenly distributed and uniformly directed electromagnetic force over said coil and, consequently, over said diaphragm.

11. An electromagnetic motor mechanism for utilization within a receiver or horn loudspeaker driver comprising, in combination, a pair of repelling horseshoe magnets having spacing means and arranged with their like poles facing thereby forming a magnetic air gap having flattened and orientated magnetic lines of force between the poles, a flat, rectangular-shaped diaphragm, and a helical signal-conveying coil—a portion of which being wound over and secured to a surface of said diaphragm; said magnets being placed so that the surface of the north pole of one of the two said magnets faces and is parallel to the surface of the north pole of the other said magnet, and the surface of the south pole of one of the two said magnets faces and is parallel to the surface of the south pole of the other said magnet—the facing said poles being substantially mutually coextensive; said diaphragm having supporting means for suspension within said magnetic air gap so that the surfaces of said diaphragm and said secured coil portion are substantially parallel to the facing pole surfaces of both said magnets and to the said flattened and orientated magnetic lines of force, and said coil having the portion of its windings within said magnetic air gap coextensive with said flattened and orientated magnetic lines of force and arranged, when at rest, to everywhere cross said lines of force lying on its surface at substantially a right angle and in the same direction relative to the paths of said lines of force so that a signal current passed in either direction through said coil will produce an evenly distributed and uniformly directed electromagnetic force over said coil and, consequently, over said diaphragm.

12. In an electromagnetic phonograph pickup of the type in which a current-generating coil is secured to, and actuated in a magnetic field by, pivot-clamped actuating means terminating in a stylus, the electromagnetic mechanism comprising a diaphragm, a signal-conveying coil wound over and secured to said diaphragm, a pair of repelling horseshoe magnets, and means supporting said magnets with their poles separated to provide for a magnetic air gap having flattened and orientated magnetic lines of force between, and substantially parallel to, the poles of the magnets; said diaphragm and said coil being means suspended in said magnetic air gap, and said magnets being placed so that the north pole of one of the two said magnets faces and is substantially coextensive with and parallel to the north pole of the other said magnet, and the south pole of one of the two said magnets faces and is substantially coextensive with and parallel to the south pole of the other said magnet; said coil having its surface within said gap substantially parallel to the pole faces of both said magnets when at rest, and arranged so that a current passing in either direction through said coil would cut substantially normally across, and always in the same direction relative to, the paths of the said flattened and orientated magnetic lines of force generated by said magnets and lying on said coil surface, and thereby cause a uniformly distributed and directed electromagnetic driving force to be applied over said coil and, consequently, over said diaphragm.

References Cited in the file of this patent

UNITED STATES PATENTS

| | | |
|---|---|---|
| 905,781 | Baldwin | Dec. 1, 1908 |
| 1,577,294 | Pihl | Mar. 16, 1926 |
| 1,845,986 | Richmond | Feb. 16, 1932 |
| 1,918,164 | Woolf et al. | July 11, 1933 |
| 2,271,525 | Seabert | Feb. 3, 1942 |
| 2,404,798 | Harry et al. | July 30, 1946 |
| 2,535,757 | Root | Dec. 26, 1950 |
| 2,781,461 | Booth et al. | Feb. 12, 1957 |
| 2,847,326 | Muller | Aug. 12, 1958 |
| 2,848,560 | Wiegand | Aug. 19, 1958 |
| 2,883,478 | McConnell | Apr. 21, 1959 |
| 3,066,200 | Pavlok | Nov. 27, 1962 |

FOREIGN PATENTS

| | | |
|---|---|---|
| 116,391 | Germany | Dec. 22, 1900 |
| 134,078 | Austria | July 10, 1933 |
| 1,169,701 | France | Sept. 15, 1958 |
| 1,218,259 | France | Dec. 14, 1959 |